US012483507B2

(12) United States Patent
Miyamoto et al.

(10) Patent No.: US 12,483,507 B2
(45) Date of Patent: Nov. 25, 2025

(54) COMMUNICATION SYSTEM AND COMMUNICATION CONTROL APPARATUS

(71) Applicant: NTT, Inc., Tokyo (JP)

(72) Inventors: Kenji Miyamoto, Musashino (JP);
Yoshihito Sakai, Musashino (JP);
Tatsuya Shimada, Musashino (JP)

(73) Assignee: NTT, Inc., Tokyo (JP)

( * ) Notice: Subject to any disclaimer, the term of this patent is extended or adjusted under 35 U.S.C. 154(b) by 24 days.

(21) Appl. No.: 18/691,690

(22) PCT Filed: Oct. 12, 2021

(86) PCT No.: PCT/JP2021/037644
§ 371 (c)(1),
(2) Date: Mar. 13, 2024

(87) PCT Pub. No.: WO2023/062705
PCT Pub. Date: Apr. 20, 2023

(65) Prior Publication Data
US 2025/0007844 A1    Jan. 2, 2025

(51) Int. Cl.
*G06F 15/16* (2006.01)
*H04L 47/22* (2022.01)
(Continued)

(52) U.S. Cl.
CPC ......... *H04L 47/22* (2013.01); *H04W 28/0268* (2013.01); *H04W 28/22* (2013.01)

(58) Field of Classification Search
CPC .... H04L 47/22; H04W 28/0268; H04W 28/22
(Continued)

(56) References Cited

U.S. PATENT DOCUMENTS 7,496,674 B2 *  2/2009  Jorgensen ........... H04W 12/033
                                                                709/224
8,280,994 B2 * 10/2012  Blouin ................ H04L 43/0817
                                                                709/224
(Continued)

FOREIGN PATENT DOCUMENTS

JP   2007-502584 A    2/2007
WO   WO-2010/070699 A1   6/2010
WO   WO-2019/220606 A1  11/2019

OTHER PUBLICATIONS

"IEICE Knowledge Base", Group 5, Part 4, IECE, 2010.
(Continued)

*Primary Examiner* — Moustafa M Meky

(57) ABSTRACT

Provided is a communication system comprising: at least one base station accommodating a wireless terminal; at least one transfer device which transfers, to a higher level, an uplink communication of the wireless terminal received via the base station; and a transfer device controller which controls the at least one transfer device, and the communication system further includes: an information acquisition unit for acquiring information regarding a wireless communication for each quality-of-service class between the base station and the wireless terminal; a rate determination unit for determining, for each of the quality-of-service classes, a shaping rate for traffic shaping such that a packet loss caused by congestion does not occur, on the basis of the information regarding the wireless communication for each quality-of-service class; and a communication control unit for executing, for each quality-of-service class, the traffic shaping at the higher level to the base station on the basis of the shaping rate determined by the rate determination unit.

8 Claims, 8 Drawing Sheets

(51) Int. Cl.
*H04W 28/02* (2009.01)
*H04W 28/22* (2009.01)

(58) Field of Classification Search
USPC .......................................................... 709/238
See application file for complete search history.

(56) References Cited

U.S. PATENT DOCUMENTS

| | | | |
|---|---|---|---|
| 8,660,008 B2* | 2/2014 | Babiarz | H04L 41/5019 370/235 |
| 9,351,193 B2* | 5/2016 | Raleigh | H04L 12/14 |
| 9,538,220 B2* | 1/2017 | ElArabawy | H04N 21/26208 |
| 9,603,047 B2* | 3/2017 | Sridhar | H04W 28/0268 |
| 10,063,606 B2* | 8/2018 | Bao | H04L 65/60 |
| 10,200,541 B2* | 2/2019 | Raleigh | H04M 15/83 |
| 10,492,102 B2* | 11/2019 | Raleigh | H04W 28/02 |
| 11,026,247 B2* | 6/2021 | Vesterinen | H04W 28/22 |
| 11,240,701 B2* | 2/2022 | Fiorani | H04W 72/543 |
| 12,143,852 B2* | 11/2024 | Di Girolamo | H04L 43/14 |
| 12,309,638 B2* | 5/2025 | Wikström | H04W 28/065 |
| 2005/0041584 A1 | 2/2005 | Lau et al. | |
| 2011/0235512 A1 | 9/2011 | Yuki | |
| 2017/0078922 A1* | 3/2017 | Raleigh | H04L 69/18 |
| 2017/0280474 A1* | 9/2017 | Vesterinen | H04W 28/22 |
| 2020/0280872 A1* | 9/2020 | Fiorani | H04W 28/24 |
| 2021/0144585 A1 | 5/2021 | Toeda et al. | |
| 2021/0243649 A1* | 8/2021 | Wikström | H04W 40/00 |
| 2022/0116814 A1* | 4/2022 | Di Girolamo | H04L 65/80 |
| 2023/0007565 A1* | 1/2023 | Mildh | H04W 40/24 |
| 2023/0362676 A1* | 11/2023 | Andretzky | H04W 24/02 |

OTHER PUBLICATIONS

3GPP TS 23.501 V17.0.0, Technical Specification Group Services and System Aspects; System architecture for the 5G System (5GS); Stage 2, 2021.

3GPP TS 28.552 V17.3.1, Technical Specification Group Services and System Aspects; Management and orchestration; 5G performance measurements, 2021.

3GPP TS 38.321 V16.4.0, Technical Specification Group Radio Access Network; NR; Medium Access Control (MAC) protocol specification, 2021.

3GPP TS 38.211 V16.5.0, Technical Specification Group Radio Access Network; NR; Physical channels and modulation, 2021.

* cited by examiner

COMMUNICATION SYSTEM AND COMMUNICATION CONTROL APPARATUS

CROSS-REFERENCE TO RELATED APPLICATIONS

This application is a 371 U.S. National Phase of International Application No. PCT/JP2021/037644, filed on Oct. 12, 2021. The entire disclosure of the above application is incorporated herein by reference.

TECHNICAL FIELD

The present invention relates to a technology of a communication system that accommodates a wireless terminal, and a communication control apparatus.

BACKGROUND ART

In a case where a plurality of base stations are connected with a transfer device network, in a case where a plurality of wireless terminals are connected with one base station, or in a case where one wireless terminal has a plurality of traffic flows or the like, data of a plurality of traffic flows may enter the transfer device network together. In such cases, bandwidth guarantee type service provision in which bandwidth control for applying traffic shaping in a band set in advance for each quality of service (QOS) class, or best effort type service provision in which bandwidth guarantee is not performed is generally performed.

For example, in bandwidth control by class based queueing (CBQ) described in Non Patent Literature 1, an empty band is allocated to another QoS class as necessary when a bandwidth increase occurs in a specific QoS class. This makes it possible to temporarily communicate in a band equal to or higher than the shaping rate.

CITATION LIST

Non Patent Literature

Non Patent Literature 1: "IEICE "Knowledge Base"", Group 5, Part 4, IECE, 2010.
Non Patent Literature 2: "3GPP TS 23.501 V17.0.0", 3GPP, 2021.
Non Patent Literature 3: "3GPP TS 28.552 V17.3.1", 3GPP, 2021.
Non Patent Literature 4: "3GPP TS 38.321 V16.4.0", 3GPP, 2021.
Non Patent Literature 5: "3GPP TS 38.211 V16.5.0", 3GPP, 2021.

SUMMARY OF INVENTION

Technical Problem

FIG. 8 is a diagram illustrating a configuration example of a mobile communication system 90a according to a conventional technology. The mobile communication system 90a includes, for example, a server 91a, one or more transfer devices 92a, a transfer device controller 93a, and base stations 94a. The server 91a is a device that communicates with each of one or more wireless terminals 95a. The one or more transfer devices 92a are devices that constitute a transfer device network 96a and transfer signals exchanged between the server 91a and each of the wireless terminals 95a. The transfer device controller 93a is a device that controls the one or more transfer devices 92a by transmitting control signals. Each base station 94a is a device that communicates with each of the one or more wireless terminals 95a, transmits a signal transferred from a transfer device 92a to each of the one or more wireless terminals 95a, and transfers a signal received from each of the one or more wireless terminals 95a to the transfer device 92a. The server 91a and each wireless terminal 95a have one or more traffic flows.

As in the above conventional technology, in a case where a plurality of base stations 94a are connected with one transfer device 92a, in a case where a plurality of wireless terminals 95a are connected with one base station 94a, or in a case where one wireless terminal 95a has a plurality of traffic flows, these different types of traffic flows may enter the transfer device network 96a together. Then, in a case where a bandwidth increase equal to or greater than the shaping rate occurs in a specific QoS class, if there is an empty band, the empty band may be allocated to another QoS class as necessary, for example, as in the CBQ of the above conventional technology.

However, in a case where a bandwidth increase equal to or greater than the shaping rate occurs in a specific QoS class, an empty band cannot be allocated to another QoS class if there is no empty band. In this case, there is a problem that packet loss may occur in a traffic flow of the QoS class in the transfer device network 96a.

In view of the above circumstances, an object of the present invention is to provide a technology capable of suppressing occurrence of packet loss.

Solution to Problem

One aspect of the present invention is a communication system including: at least one base station that accommodates a wireless terminal; at least one transfer device that transfers upstream communication of the wireless terminal received via the base station to a host side; and a transfer device controller that controls the at least one transfer device, in which the communication system further includes: an information acquisition unit that acquires information regarding wireless communication between the base station and the wireless terminal for each service quality class; a rate determination unit that determines a shaping rate of traffic shaping for each service quality class on the basis of the information regarding wireless communication for each service quality class so that packet loss due to congestion does not occur; and a communication control unit that executes traffic shaping for each service quality class on a host side of the base station on the basis of the shaping rate determined by the rate determination unit.

One aspect of the present invention is a communication control method performed in a communication system including: at least one base station that accommodates a wireless terminal; at least one transfer device that transfers upstream communication of the wireless terminal received via the base station to a host side; and a transfer device controller that controls the at least one transfer device, in which the communication control method includes: an information acquisition step of acquiring information regarding wireless communication between the base station and the wireless terminal for each service quality class; a rate determination step of determining a shaping rate of traffic shaping for each service quality class on the basis of the information regarding wireless communication for each service quality class so that packet loss due to congestion does not occur; and a communication control step of executing traffic shaping for each service quality class on a host side of the base station on the basis of the shaping rate determined in the rate determination step.

Advantageous Effects of Invention

According to the present invention, occurrence of packet loss can be suppressed.

DESCRIPTION OF EMBODIMENTS

Embodiments of the present invention will be described in detail with reference to the drawings.

First Embodiment

[System Configuration of Mobile Communication System]

Figure 1:
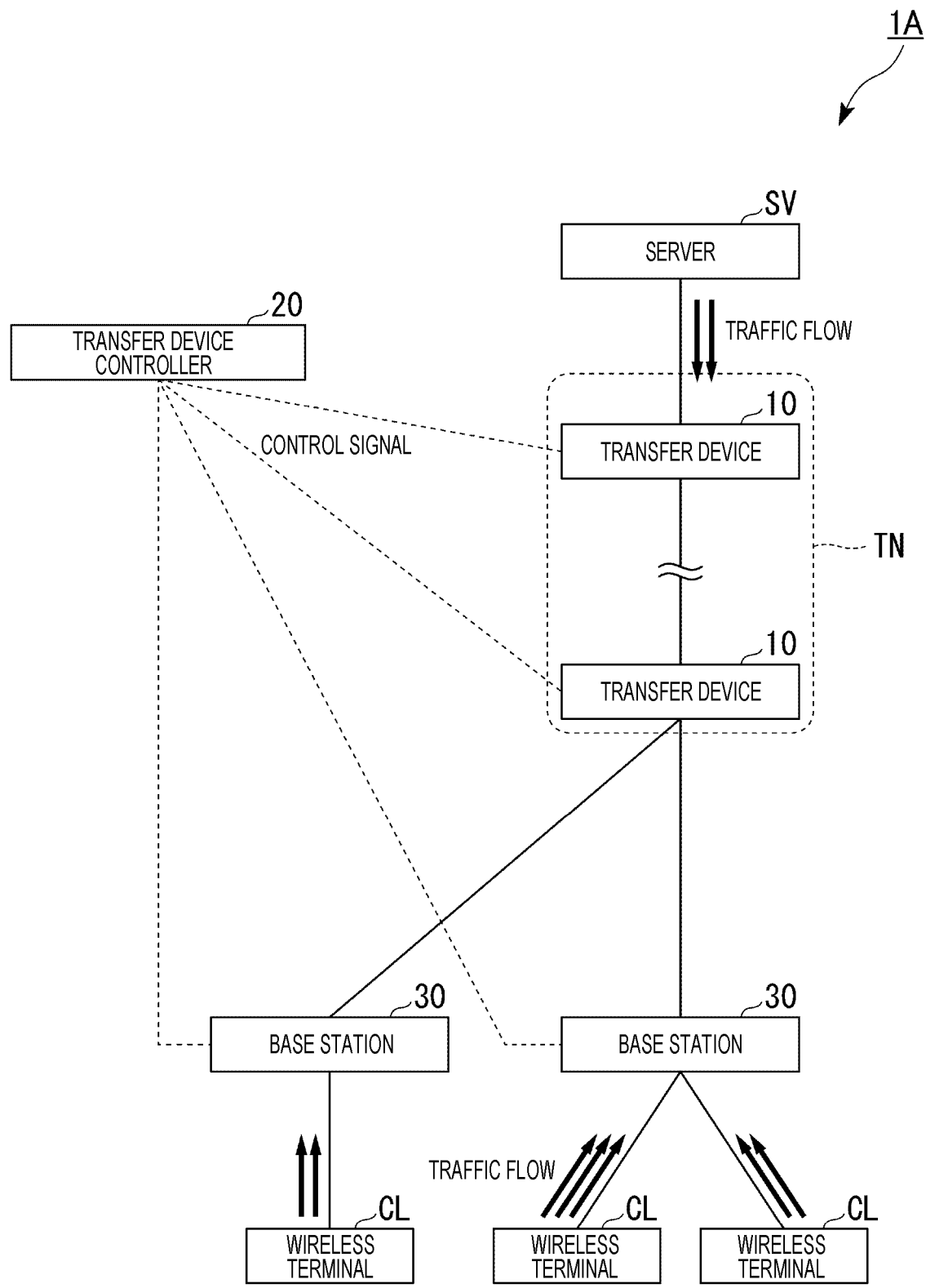
FIG. 1 is a diagram illustrating a system configuration example of a mobile communication system according to a first embodiment.

FIG. 1 is a diagram illustrating a system configuration example of a mobile communication system 1A according to a first embodiment. The mobile communication system 1A includes, for example, one or more transfer devices 10, a transfer device controller 20, and one or more base stations 30. A server SV is a device that communicates with each of one or more wireless terminals CL.

The one or more transfer devices 10 are devices that constitute a transfer device network TN and transfer signals exchanged between the server SV and each of the one or more wireless terminals CL. The transfer device controller 20 is a device that controls the one or more transfer devices 10 by transmitting control signals. Each base station 30 is a device that communicates with each of the one or more wireless terminals CL, transmits a signal transferred from a transfer device 10 to a wireless terminal CL, and transfers a signal received from a wireless terminal CL to the transfer device 10. The server SV and each of the one or more wireless terminals CL have one or more traffic flows. The transfer device controller 20 is communicably connected with each of the one or more transfer devices 10 and the base stations 30.

The one or more transfer devices 10, the transfer device controller 20, and the base stations 30 provided in the mobile communication system 1A are configured using, for example, a processor such as a central processing unit (CPU), a memory, and a communication interface. Each device of the one or more transfer devices 10, the transfer device controller 20, and the base stations 30 functions as a communication device including a control unit when a processor executes a program.

The control unit provides each function for causing the communication device to function as a transfer device 10, the transfer device controller 20, or a base station 30. All or some of the functions of the control unit may be implemented by using hardware such as an application specific integrated circuit (ASIC), a programmable logic device (PLD), or a field programmable gate array (FPGA).

The above program may be recorded on a computer-readable recording medium. The computer-readable recording medium is, for example, a portable medium such as a flexible disk, a magneto-optical disk, a ROM, a CD-ROM, or a semiconductor storage device (e.g., solid state drive (SSD)), or a storage device such as a hard disk or a semiconductor storage device built in a computer system. The above program may be transmitted via a telecommunication line.

[Specific Example of Functional Configuration of Mobile Communication System]

Figure 2:
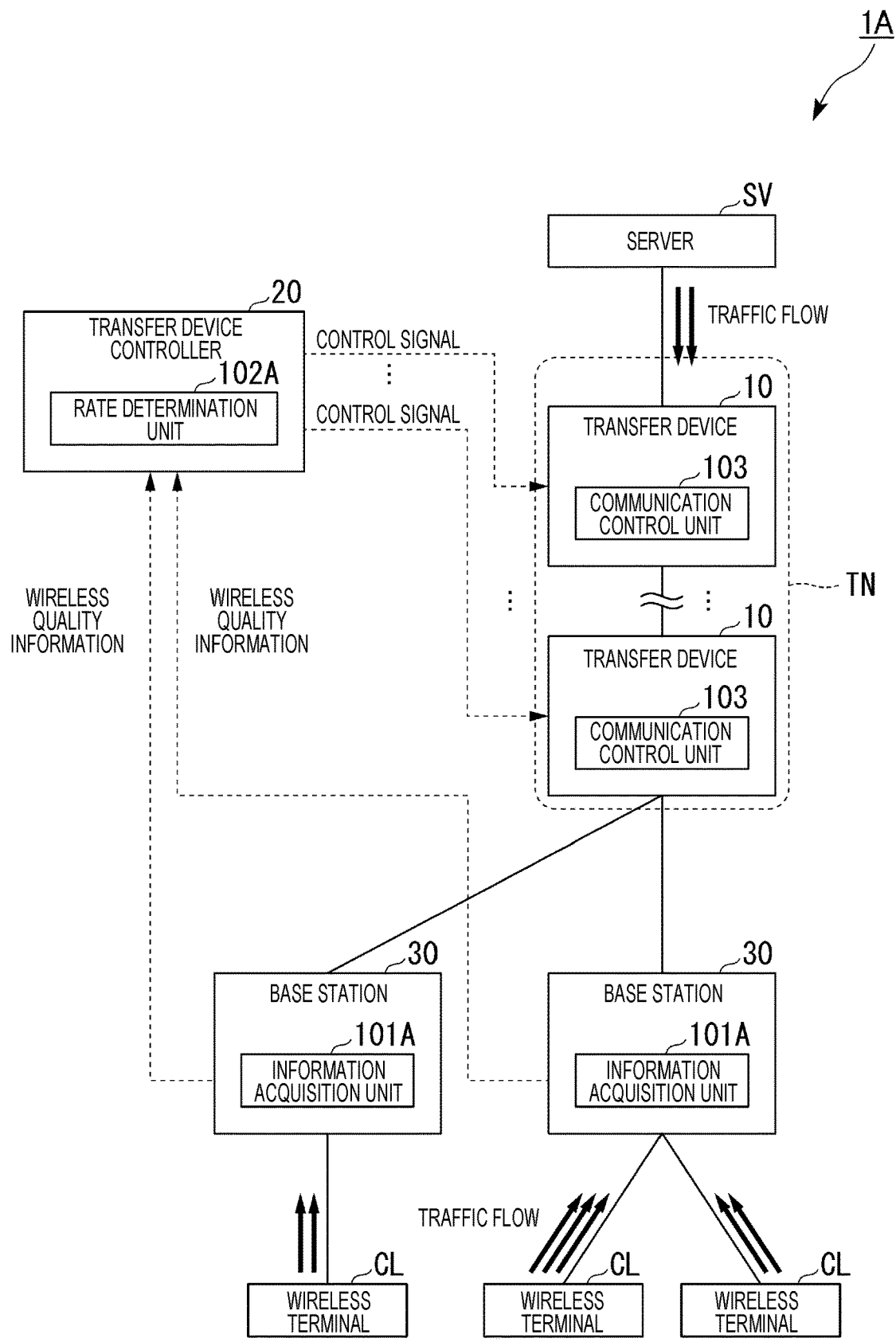
FIG. 2 is a diagram illustrating a specific example of a functional configuration of the mobile communication system according to the first embodiment.

FIG. 2 is a diagram illustrating a specific example of a functional configuration of the mobile communication system 1A according to the first embodiment. The mobile communication system 1A includes, for example, one or more information acquisition units 101A (one or more information acquirer), a rate determination unit 102A (a rate determiner), and one or more communication control units 103 (one or more communication controller).

Each information acquisition unit 101A acquires information (which will be hereinafter referred to as "wireless communication information") regarding wireless communication between a base station 30 and a wireless terminal CL. The rate determination unit 102A collects wireless communication information acquired by each of the one or more information acquisition units 101A, and determines the shaping rate of traffic shaping for each QoS class (service quality class) on the basis of the collected wireless communication information so that packet loss due to congestion in the transfer device network TN does not occur. Each communication control unit 103 executes traffic shaping on the host side of the base station 30 on the basis of the shaping rate determined by the rate determination unit 102A.

Specifically, in the mobile communication system 1A according to the first embodiment, each information acquisition unit 101A is provided in a control unit of a base station 30, the rate determination unit 102A is provided in a control unit of the transfer device controller 20, and each communication control unit 103 is provided in a control unit of a transfer device 10.

In this case, the one or more information acquisition units 101A acquire information (which will be hereinafter referred to as "wireless quality information") including control information regarding the quality of wireless communication between a base station 30 and a wireless terminal CL as wireless communication information, and transmit the acquired wireless quality information to the transfer device controller 20. The wireless quality information includes information indicating the number of traffic flows and the traffic volume for each QoS class in wireless communication between a base station 30 and a wireless terminal CL. Note that the wireless quality information may include information regarding communication quality for each traffic flow and information indicating priority for each traffic flow.

The rate determination unit 102A collects the wireless quality information acquired by each of the one or more information acquisition units 101A, and determines the shaping rate for each QoS class on the basis of the collected wireless quality information. Here, the rate determination unit 102A determines the shaping rate of traffic shaping for each QoS class in consideration of the priority of the traffic flow and the traffic volume within a range satisfying a predetermined delay requirement so that packet loss due to congestion in the transfer device network TN does not occur. The rate determination unit 102A notifies the communication control units 103 of the transfer devices 10 of the determined shaping rate.

Then, the communication control units 103 in the one or more transfer devices 10 each execute traffic shaping of the own device on the basis of the shaping rate, a notice of which is given from the rate determination unit 102A of the transfer device controller 20.

Here, the wireless quality information acquired as wireless communication information is, for example, a 5G QoS indicator (5QI) (e.g., refer to Non Patent Literature 2) assigned to the header of the N3 interface signal in 5th generation (5G) mobile communication, a PDCP SDU data volume for each 5QI, or the number of QoS flow successfully established (e.g., refer to Non Patent Literature 3) for each 5QI.

For example, the rate determination unit 102A of the transfer device controller 20 stores in advance a correspondence table (correspondence information) in which a candidate of an appropriate shaping rate set in advance according to a value of 5QI is associated with the value of 5QI, and determines a shaping rate associated with the value of 5QI (wireless quality information) acquired from a base station 30 in the correspondence table as the shaping rate to be applied to the transfer devices 10. Note that an appropriate shaping rate is a communication rate that is low enough to narrow the communication band so that packet loss due to congestion in the transfer device network TN does not occur, while maintaining at least the minimum necessary communication rate.

Alternatively, examples of the wireless quality information acquired as wireless communication information include a buffer status report (e.g., refer to Non Patent Literature 4) of a scheduling request or an uplink grant received by the base station 30 from a wireless terminal CL, and a wireless frame number, a subframe number, and a slot number (e.g., refer to Non Patent Literature 5) of the scheduling request, the uplink grant, and the buffer status report received by the base station.

Generally, the scheduling request is information transmitted by a wireless terminal to notify a base station that the upstream communication is started. Moreover, the uplink grant is information transmitted by downstream communication in order for the base station to notify a wireless terminal of the wireless communication scheme for permitting the upstream communication and the frequency resource allocation, and indirectly indicates the data volume of the upstream communication. Moreover, the buffer status report is information transmitted by the wireless terminal to notify a base station of how much data is held in the buffer.

The wireless frame number, the subframe number, and the slot number are numbers in a data unit of three stages transmitted by wireless communication. The wireless frame is 10 [ms], the subframe is 1 [ms], and the slot is defined as a length selected from, for example, 1 [ms], 0.5 [ms], and the like, and the transmission/reception timing of wireless communication can be obtained from these numbers.

The scheduling request, the uplink grant, and the buffer status report are transmitted in association with a wireless frame number, a subframe number, and a slot number indicating a transmission timing of upstream communication. In this case, the rate determination unit 102A collects the wireless quality information acquired by each of the one or more information acquisition units 101A, and determines an appropriate shaping rate for each QoS class by calculation on the basis of the collected wireless quality information.

Specifically, the rate determination unit 102A recognizes the amount of data (which will be hereinafter referred to as "buffer data") buffered in a wireless terminal CL on the basis of the buffer status report received from the wireless terminal CL. The rate determination unit 102A calculates a communication rate low enough to narrow the communication band as an appropriate shaping rate so that packet loss due to congestion in the transfer device network TN does not occur, while maintaining at least the minimum communication rate necessary for transmission of buffer data of the recognized data volume.

More specifically, for example, when the rate determination unit 102A acquires a scheduling request from an information acquisition unit 101A, the shaping rate is initialized, and a wireless frame number, a subframe number, and a slot number associated with the acquired scheduling request are held. Thereafter, every time the rate determination unit 102A acquires a buffer status report from an information acquisition unit 101A, the shaping rate is updated.

In updating the shaping rate, for example, a cumulative value of the data volume of the upstream communication calculated from one or more uplink grants acquired by the rate determination unit 102A from the information acquisition units 101A and the data volume held by the wireless terminals included in the buffer status report are added between a wireless frame number, a subframe number, and a slot number associated with a scheduling request and a wireless frame number, a subframe number, and a slot number associated with a buffer status report, and are divided by a time interval calculated from the wireless frame number, the subframe number, and the slot number associated with the scheduling request and the wireless frame number, the subframe number, and the slot number associated with the buffer status report to determine the shaping rate.

Note that the rate determination unit 102A may be configured to collect information (which will be hereinafter referred to as "state information") regarding the state of the transfer device network TN from the transfer devices 10 and calculate the shaping rate to be applied to the transfer devices 10 on the basis of the state information and the wireless quality information acquired from the base stations 30. For example, the rate determination unit 102A may calculate the shaping rate in consideration of a congestion state of the transfer device network TN recognized on the basis of the state information.

According to the mobile communication system 1A of the first embodiment configured as described above, the transfer devices 10 perform shaping according to the shaping rate determined for each QoS class on the basis of the wireless quality information regarding wireless communication between the wireless terminals CL and the base stations 30, so that occurrence of packet loss due to congestion that may occur in the transfer device network TN can be suppressed.

[Effect of Suppressing Occurrence of Packet Loss]

Figure 3:
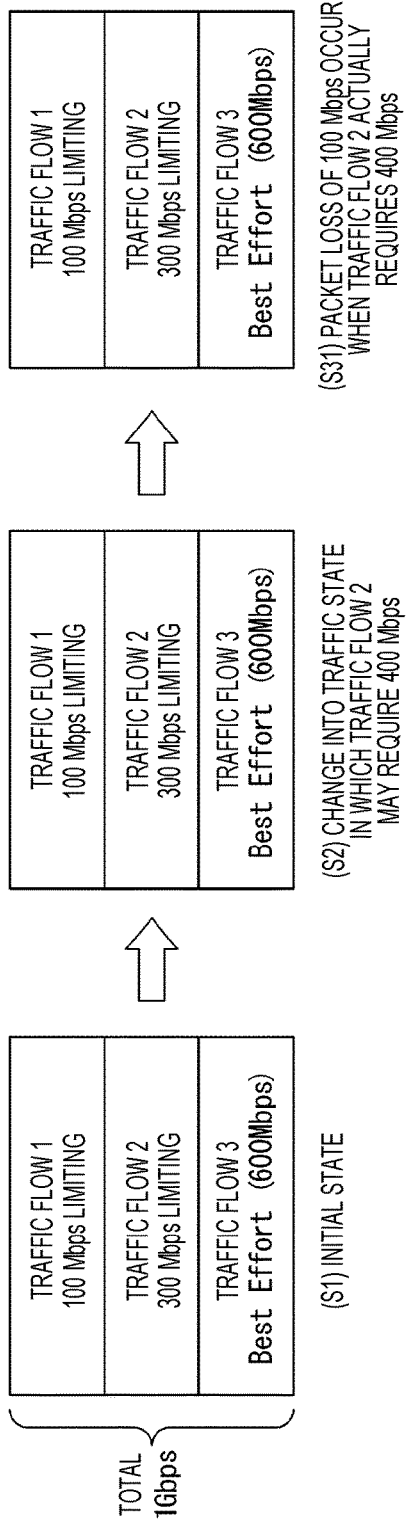
FIG. 3 is an image view showing that an effect of suppressing occurrence of packet loss is obtained by shaping of a transfer device in the mobile communication system according to the first embodiment.
Figure 3:
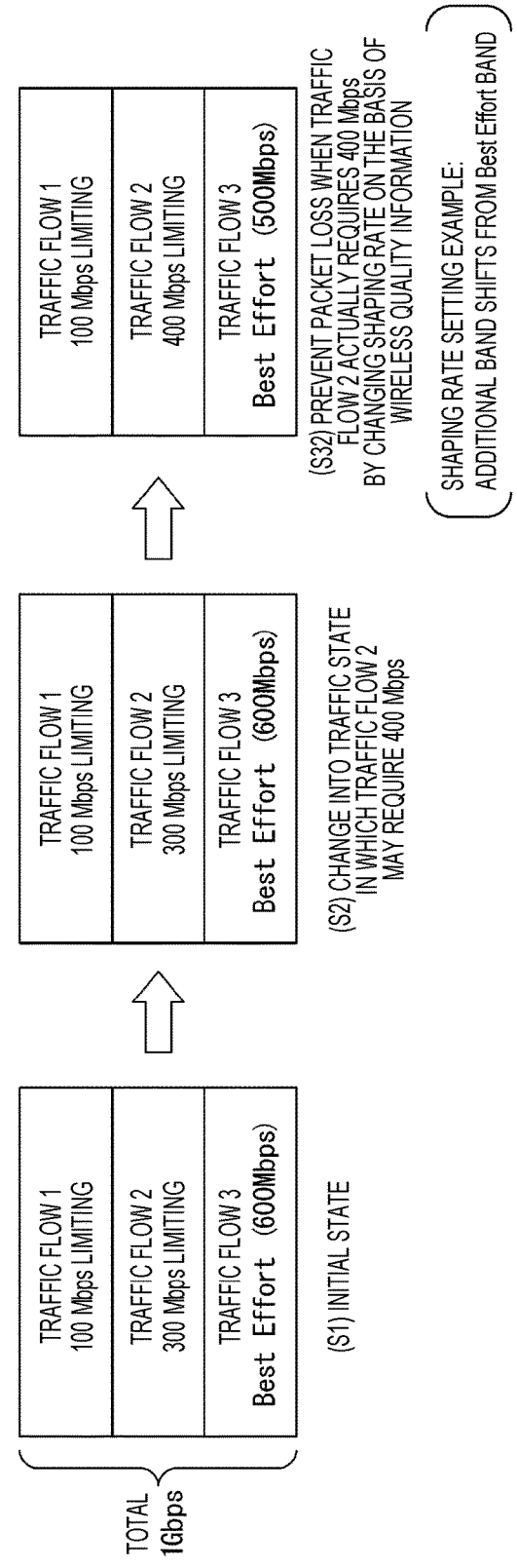

FIG. 3 is an image view showing that an effect of suppressing occurrence of packet loss is obtained by shaping of the transfer devices 10 in the mobile communication system 1A according to the first embodiment. In FIG. 3, the upper view shows a situation in which packet loss occurs in a conventional technology, and the lower view shows a situation in which occurrence of packet loss is suppressed by the mobile communication system 1A according to the present embodiment.

Here, as an example, it is assumed that a first traffic flow (which will be hereinafter referred to as "traffic flow 1") having bandwidth limiting of 100 [Mbps], a second traffic flow (which will be hereinafter referred to as "traffic flow 2") having bandwidth limiting of 300 [Mbps], and a third traffic flow (which will be hereinafter referred to as "traffic flow 3") providing the remaining band of 600 [Mbps] in a best effort manner are set for a total band of 1 [Gbps]. In addition, a case where the state of the traffic flow 2 changes to a traffic state in which a bandwidth of 400 [Mbps] may be required for bandwidth limiting of 300 [Mbps] due to occurrence of bandwidth increase will be considered.

Note that the flow (steps S1 to S2) from the initial state to the state change of the traffic flow 2 due to the bandwidth increase is the same in the conventional technology and the present embodiment. Hereinafter, the flow from step S1 to step S2, which is the same in the conventional technology and the present embodiment, will be first described.

First, step S1 in FIG. 3 represents an initial state and represents a situation in which packet loss due to congestion cannot occur. Specifically, step S1 is a state in which the band required in the traffic flow 1 is within the range of bandwidth limiting (100 [Mbps]) set in advance for the traffic flow 1, the band required in the traffic flow 2 is within the range of bandwidth limiting (300 [Mbps]) set in advance for the traffic flow 2, and the band required in the traffic flow 3 is within the range of the remaining band (600 [Mbps]).

Next, step S2 in FIG. 3 represents a situation in which the traffic state of the traffic flow 2 changes and packet loss due to congestion may occur. Specifically, step S2 is a state in which the band required in the traffic flow 2 is increased to 400 [Mbps] and exceeds the range of bandwidth limiting (300 [Mbps]) set in advance for the traffic flow 2.

Thereafter, in a communication system according to a conventional technology, packet loss occurs when the buffer cannot withstand the change in the traffic state in which the required band exceeds the range of bandwidth limiting, which occurs in the traffic flow 2. Specifically, when a bandwidth of 400 [Mbps] is actually required in the traffic flow 2, a packet loss of 100 [Mbps] occurs (step S31).

In contrast to the above conventional technology, the mobile communication system 1A according to the present embodiment changes the shaping rate in advance on the basis of the wireless quality information acquired in advance by an information acquisition unit 101A. Specifically, for example, as illustrated in FIG. 3, the mobile communication system 1A according to the present embodiment predicts that a band of 100 [Mbps] is insufficient in the traffic flow 2 by calculation based on wireless quality information acquired in advance, and increases (extends) the bandwidth limiting of the traffic flow 2 from 300 [Mbps] to 400 [Mbps] in advance (step S32). That is, in the mobile communication system 1A according to the present embodiment, the rate determination unit 102A is configured to acquire the wireless quality information from the information acquisition unit 101A before the traffic actually reaches the transfer device network TN, and appropriately set the shaping rate for each QoS class previously. At this time, the band of the best effort type traffic flow 3 is naturally reduced from 600 [Mbps] to 500 [Mbps].

According to the mobile communication system 1A of the first embodiment configured as described above, the transfer devices 10 perform shaping for each QoS class according to the shaping rate determined for each QoS class on the basis of the wireless quality information regarding wireless communication between the one or more wireless terminals CL and the one or more base stations 30. The mobile communication system 1A according to the first embodiment can increase (extend) the shaping rate in advance before getting into a state in which packet loss due to congestion in the transfer device network TN may occur in a specific traffic flow. As a result, the mobile communication system 1A according to the first embodiment can suppress occurrence of packet loss due to congestion that may occur in the transfer device network TN.

Note that, in the example in FIG. 3, the mobile communication system 1A according to the present embodiment is configured to prevent occurrence of packet loss by temporarily shifting a part of the band of the best effort type traffic flow 3 to the traffic flow 2 as described above. However, the present invention is not limited to such a configuration. For example, a configuration may be employed in which a part of the band of a traffic flow having bandwidth limiting such as the traffic flow 1 illustrated in FIG. 3 is temporarily shifted to another traffic flow as necessary.

Note that, in the mobile communication system 1A according to the first embodiment, the configuration in which the transfer device controller 20 determines the shaping rate of the transfer devices 10 for each QoS class on the basis of the wireless quality information is also applicable to communication systems other than the mobile communication system. For example, if the base stations 30 are replaced with wireless local area network (LAN) access points (which will be hereinafter referred to as "wireless APs"), occurrence of packet loss due to congestion in the wireless LAN system can be suppressed by acquiring the wireless quality information regarding wireless communication between the wireless APs and the wireless terminals CL connected with the wireless APs.

(Variation)

Figure 4:
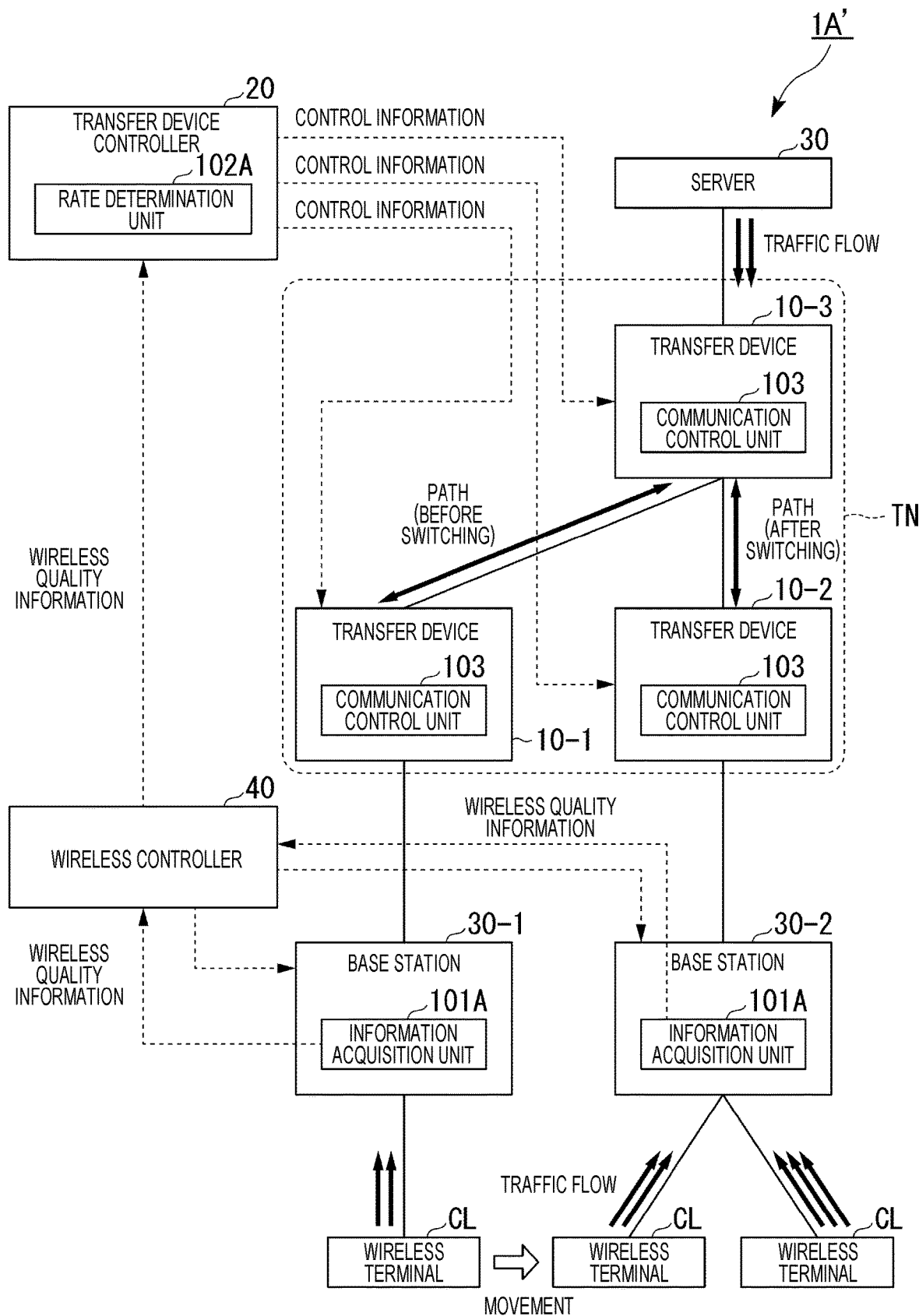
FIG. 4 is a diagram illustrating a variation of the mobile communication system according to the first embodiment.

FIG. 4 is a diagram illustrating a variation of the mobile communication system 1A according to the first embodiment. Although a case where the base stations 30 directly supply the wireless quality information to the transfer device controller 20 has been described in the first embodiment, the wireless quality information may be supplied to the transfer device controller 20 via a device other than the base stations 30 as illustrated in FIG. 4.

For example, in a case where there is a plurality of base stations 30 and there is further a wireless controller 40 that controls the plurality of base stations 30 in a mobile communication system 1A' according to the variation, the wireless controller 40 may be configured to collect wireless quality information from the plurality of base stations 30 and supply the collected wireless quality information of the plurality of base stations 30 to the transfer device controller 20.

The example in FIG. 4 illustrates a case where a wireless terminal CL after movement is accommodated in a base station 30 different from a base station 30 in which the wireless terminal CL has been accommodated before movement. Specifically, in the example in FIG. 4, the wireless terminal CL is accommodated in a base station 30-1 at a position before movement, and is accommodated in a base station 30-2 at a position after movement. In this case, the transfer device controller 20 instructs transfer devices 10-1 and 10-2 that accommodate the base stations 30-1 and 30-2, and a transfer device 10-3 positioned on a host side thereof to perform path switching accompanying the movement of the wireless terminal CL. As a result, the wireless terminal CL can continue communication with a server SV even when the base station 30 that accommodates the wireless terminal CL is changed.

In this case, in addition to controlling the base stations 30-1 and 30-2, the wireless controller 40 collects the wireless quality information respectively from the base stations 30-1 and 30-2, and supplies the collected wireless quality information to the transfer device controller 20. In this case, for example, the transfer device controller 20 determines the shaping rate to be applied to transfer devices 10 (e.g., transfer devices 10-1 and 10-3) on the communication path before the wireless terminal CL moves on the basis of the wireless quality information acquired from the base station 30-1, and determines the shaping rate to be applied to transfer devices 10 (e.g., transfer devices 10-2 and 10-3) on the communication path after the wireless terminal CL moves for each QoS class on the basis of the wireless quality information acquired from the base station 30-2. With such a configuration, the mobile communication system 1A' according to the present variation can appropriately update the shaping rate for each QoS class for the plurality of transfer devices 10 constituting the transfer device network TN adaptively to the movement of the wireless terminal CL.

Note that, in the mobile communication system 1A' according to the present variation, the configuration in which the transfer device controller 20 determines the shaping rate of the transfer devices 10 for each QoS class on the basis of the wireless quality information is also applicable to communication systems other than the mobile communication system. For example, if the base stations 30 are replaced with wireless APs, occurrence of packet loss due to congestion in a wireless LAN system can be suppressed by acquiring the wireless quality information regarding wireless communication between the wireless APs and the wireless terminals CL connected with the wireless APs.

Second Embodiment

Figure 5:
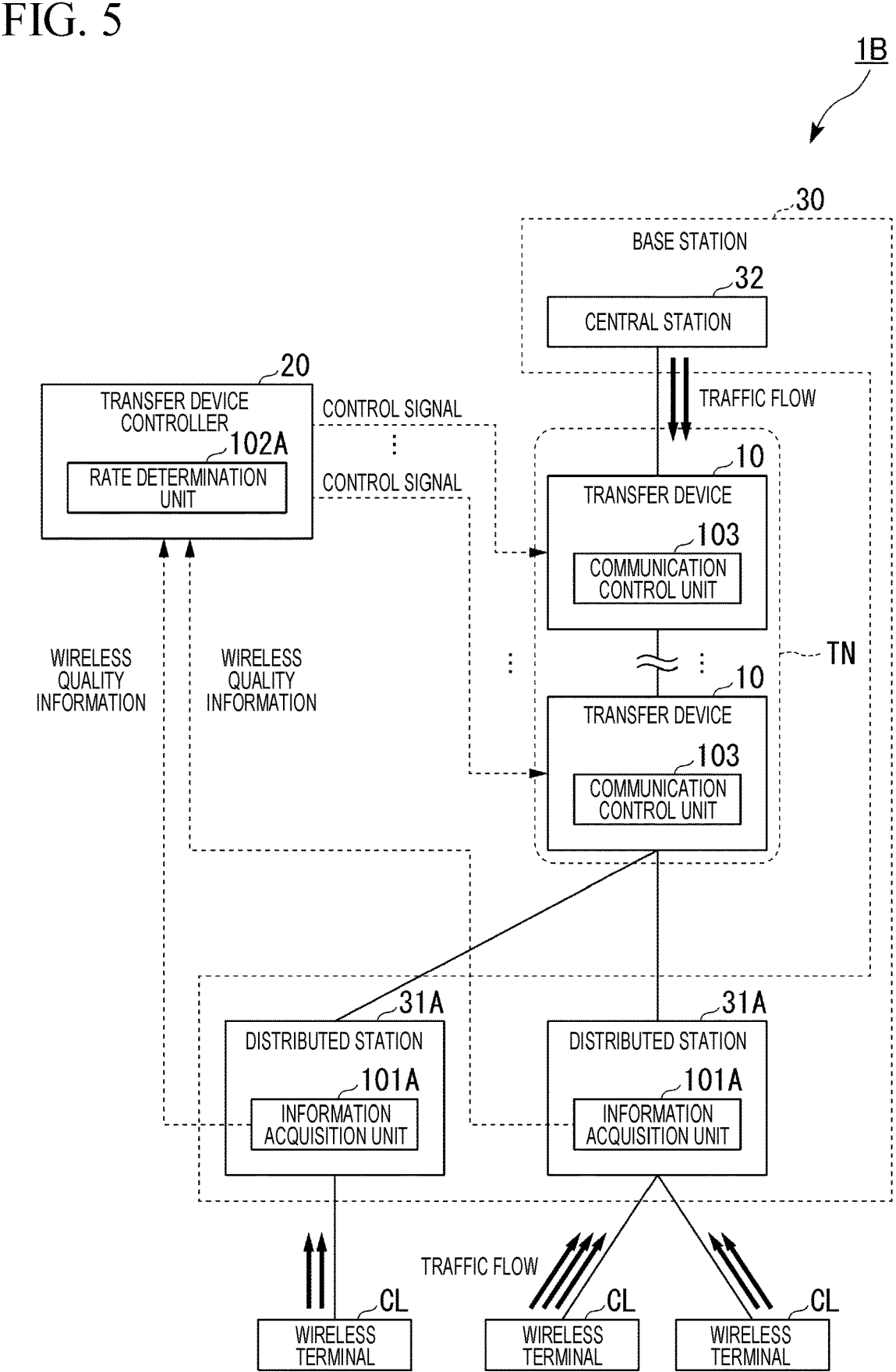
FIG. 5 is a diagram illustrating a system configuration example of a mobile communication system according to a second embodiment.

FIG. 5 is a diagram illustrating a system configuration example of a mobile communication system 1B according to a second embodiment. The mobile communication system 1B is different from the mobile communication system 1A according to the first embodiment in that a base station 30 includes one or more distributed stations 31A and a central station 32, and one or more transfer devices 10 transfer communication between the one or more distributed stations 31A and the central station 32. Other configurations of the mobile communication system 1B are similar to those of the mobile communication system 1A according to the first embodiment. Therefore, components similar to those of the mobile communication system 1A according to the first embodiment are denoted by the same reference signs as those in FIG. 2, and the description thereof will be omitted here.

As in the one or more transfer devices 10 and a transfer device controller 20 provided in the mobile communication system 1B, the one or more distributed stations 31A and the central station 32 are configured using, for example, a processor such as a CPU, a memory, and a communication interface. Each device of the one or more distributed stations 31A and the central station 32 functions as a communication device including a control unit when the processor executes a program.

The control unit provides each function for causing the communication device to function as a distributed station 31A or the central station 32. Note that all or some of the functions of the control unit may be implemented by using hardware such as an ASIC, a PLD, or an FPGA. The above program may be recorded on a computer-readable recording medium. The computer-readable recording medium is, for example, a portable medium such as a flexible disk, a magneto-optical disk, a ROM, a CD-ROM, or a semiconductor storage device (e.g., SSD), or a storage device such as a hard disk or a semiconductor storage device built in a computer system. The above program may be transmitted via a telecommunication line.

For example, the one or more distributed stations 31 and the central station 32 in the second embodiment are one or more distributed units (DUs) and a central unit (CU) in a mobile communication system. In this case, a section between the CU and the DUs where transfer devices 10 are installed is referred to as a mobile midhaul (MMH). Moreover, for example, the one or more distributed stations 31 and the central station 32 in the second embodiment may be one or more radio units (RUs) and a DU in a mobile communication system. In this case, a section between the DU and the RUs where transfer devices 10 are installed is referred to as a mobile front haul (MFH).

Specifically, in the mobile communication system 1B according to the second embodiment, each information acquisition unit 101A is provided in a control unit of a distributed station 31A, the rate determination unit 102A is provided in a control unit of the transfer device controller 20, and each communication control unit 103 is provided in a control unit of a transfer device 10.

In this case, each information acquisition unit 101A acquires wireless quality information regarding wireless communication between the one or more distributed stations 31A and one or more wireless terminals CL as wireless communication information, and transmits the acquired wireless quality information to the transfer device controller 20. The wireless quality information includes information indicating the number of traffic flows for each QoS class and the traffic volume for each QoS class in wireless communication between the base station 30 and the wireless terminals CL.

The rate determination unit 102A collects the wireless quality information acquired by the one or more information acquisition units 101A, and determines the shaping rate for each QoS class on the basis of the collected wireless quality information. Here, the rate determination unit 102A determines the shaping rate for each QoS class in consideration of the priority of the traffic flow and the traffic volume within a range satisfying a predetermined delay requirement so that packet loss due to congestion does not occur. The rate determination unit 102A notifies the communication control units 103 of the transfer devices 10 of the determined shaping rate.

Then, the communication control units 103 in the one or more transfer devices 10 each execute traffic shaping of the own device on the basis of the shaping rate, a notice of which is given from the rate determination unit 102A of the transfer device controller 20.

According to the mobile communication system 1B of the second embodiment configured as described above, the transfer devices 10 perform shaping for each QoS class according to the shaping rate determined for each QoS class on the basis of the wireless quality information regarding wireless communication between the one or more wireless terminals CL and the one or more distributed stations 31A. The mobile communication system 1B according to the second embodiment can increase the shaping rate in advance before getting into a state in which packet loss due to congestion in the transfer device network TN may occur in a specific traffic flow. As a result, the mobile communication system 1B according to the second embodiment can suppress occurrence of packet loss due to congestion that may occur in the transfer device network TN.

Note that, although a case where the base station 30 directly supplies the wireless quality information to the transfer device controller 20 has been described in the above embodiment, the wireless quality information may be supplied to the transfer device controller 20 via a device other than the base station 30. For example, in a case where there are a plurality of base stations 30 and there is further a wireless controller that controls the plurality of base stations 30 in the mobile communication system 1B, the wireless controller may be configured to collect wireless quality information from the plurality of base stations 30 and supply the collected wireless quality information of the plurality of base stations 30 to the transfer device controller 20.

Note that, in the mobile communication system 1B according to the second embodiment, the configuration in which the transfer device controller 20 determines the shaping rate of the transfer devices 10 for each QoS class on the basis of the wireless quality information is also applicable to communication systems other than the mobile communication system. For example, if the one or more distributed stations 31A and the central station 32 in the second embodiment are replaced with wireless APs and a wireless LAN controller in a wireless LAN system, occurrence of packet loss due to congestion in the wireless LAN system can be suppressed by acquiring wireless quality information regarding wireless communication between the wireless APs and the wireless terminals CL connected with the wireless APs.

Third Embodiment

Figure 6:
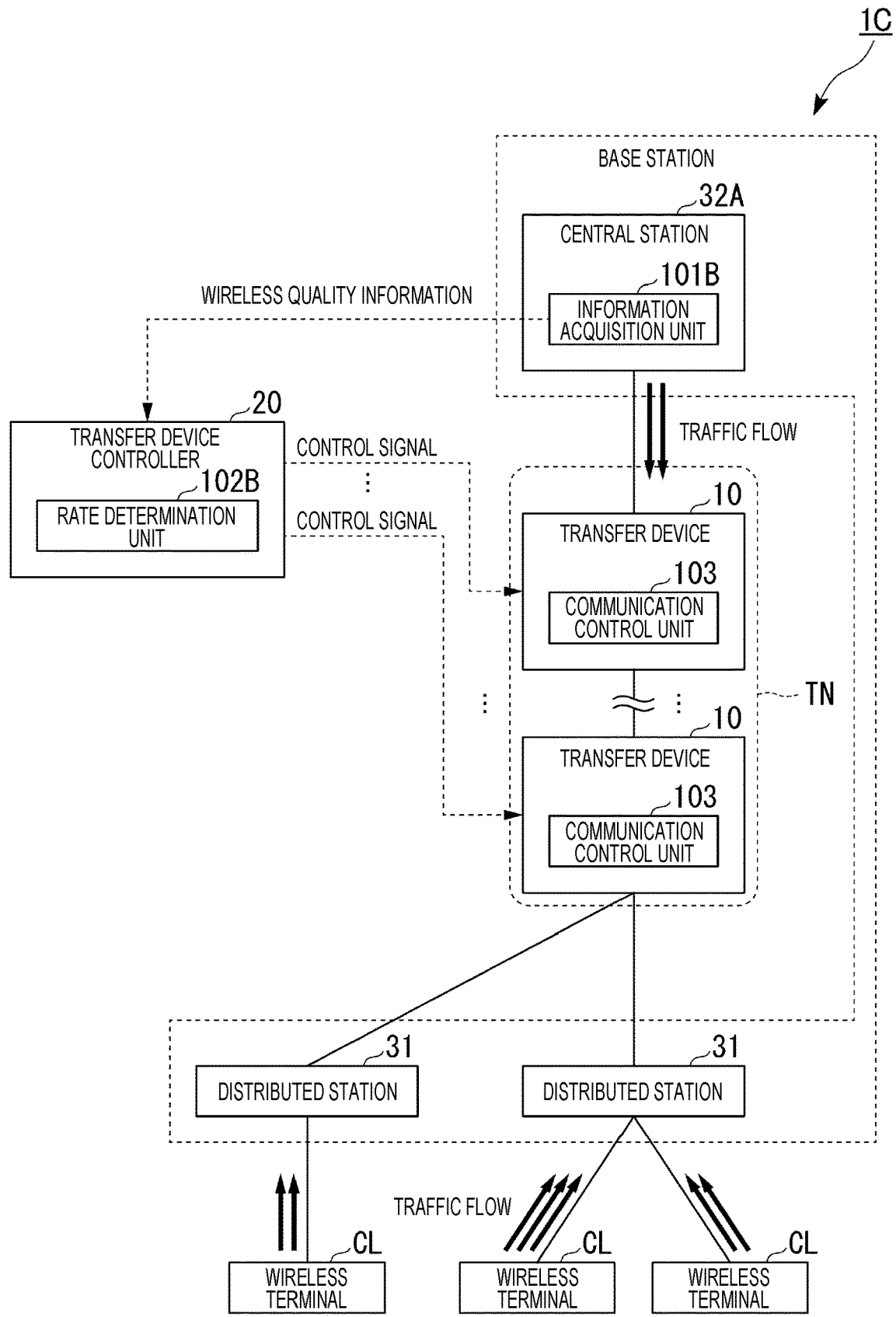
FIG. 6 is a diagram illustrating a system configuration example of a mobile communication system according to a third embodiment.

FIG. 6 is a diagram illustrating a system configuration example of a mobile communication system 1C according to a third embodiment. The mobile communication system 1C is different from the mobile communication system 1A according to the first embodiment in that a base station 30 includes one or more distributed stations 31 and a central station 32A, and one or more transfer devices 10 transfer communication between the one or more distributed stations 31 and the central station 32A. Moreover, the mobile communication system 1C is different from the mobile communication system 1B according to the second embodiment in that the central station 32A includes an information acquisition unit 101B and the distributed stations 31 do not include an information acquisition unit. Other configurations of the mobile communication system 1C are similar to those of the mobile communication system 1A according to the first embodiment. Therefore, components similar to those of the mobile communication system 1A according to the first embodiment are denoted by the same reference signs as those in FIG. 2, and the description thereof will be omitted here.

As in the one or more transfer devices 10 and a transfer device controller 20 provided in the mobile communication system 1C, the one or more distributed stations 31 and the central station 32A are configured using, for example, a processor such as a CPU, a memory, and a communication interface. Each device of the one or more distributed stations 31 and the central station 32A functions as a communication device including a control unit when the processor executes a program.

The control unit provides each function for causing the communication device to function as a distributed station 31 or the central station 32A. Note that all or some of the functions of the control unit may be implemented by using hardware such as an ASIC, a PLD, or an FPGA. The above program may be recorded on a computer-readable recording medium. The computer-readable recording medium is, for example, a portable medium such as a flexible disk, a magneto-optical disk, a ROM, a CD-ROM, or a semiconductor storage device (e.g., SSD), or a storage device such as a hard disk or a semiconductor storage device built in a computer system. The above program may be transmitted via a telecommunication line.

For example, the one or more distributed stations 31 and the central station 32A in the third embodiment are one or more DUs and a CU in a mobile communication system. In this case, a section between the CU and the DUs where transfer devices 10 are installed is referred to as MMH. Moreover, for example, the one or more distributed stations 31 and the central station 32A in the third embodiment may be one or more RUs and a DU in a mobile communication system. In this case, a section between the DU and the RUs where transfer devices 10 are installed is referred to as a mobile front haul (MFH).

Specifically, in the mobile communication system 1C according to the third embodiment, the information acquisition unit 101B is provided in a control unit of the central station 32A, the rate determination unit 102B is provided in a control unit of the transfer device controller 20, and each communication control unit 103 is provided in a control unit of a transfer device 10.

In this case, the information acquisition unit 101B acquires wireless quality information regarding wireless communication between the one or more distributed stations 31 and one or more wireless terminals CL as wireless communication information, and transmits the acquired wireless quality information to the transfer device controller 20. The wireless quality information includes information indicating the number of traffic flows for each QoS class and the traffic volume for each QoS class in wireless communication between the base station 30 and the wireless terminals CL.

The rate determination unit 102B determines the shaping rate for each QoS class on the basis of the wireless quality information acquired by the information acquisition unit 101B. Here, the rate determination unit 102B determines the shaping rate for each QoS class in consideration of the priority of the traffic flow and the traffic volume within a range satisfying a predetermined delay requirement so that packet loss due to congestion does not occur. The rate determination unit 102B notifies the communication control units 103 of the transfer devices 10 of the determined shaping rate.

Then, the communication control units 103 in the one or more transfer devices 10 each execute traffic shaping of the own device on the basis of the shaping rate, a notice of which is given from the rate determination unit 102B of the transfer device controller 20.

According to the mobile communication system 1C of the third embodiment configured as described above, the transfer devices 10 perform shaping for each QoS class according to the shaping rate determined for each QoS class on the basis of the wireless quality information regarding wireless communication between the one or more wireless terminals CL and the one or more distributed stations 31. The mobile communication system 1C according to the third embodiment can increase the shaping rate in advance before getting into a state in which packet loss due to congestion in the transfer device network TN may occur in a specific traffic flow. As a result, the mobile communication system 1C according to the third embodiment can suppress occurrence of packet loss due to congestion that may occur in the transfer device network TN.

Note that, although a case where the base station 30 directly supplies the wireless quality information to the transfer device controller 20 has been described in the above embodiment, the wireless quality information may be supplied to the transfer device controller 20 via a device other than the base station 30. For example, in a case where there are a plurality of base stations 30 and there is further a wireless controller that controls the plurality of base stations 30 in the mobile communication system 1C, the wireless controller may be configured to collect wireless quality information from the plurality of base stations 30 and supply the collected wireless quality information of the plurality of base stations 30 to the transfer device controller 20.

Note that, in the mobile communication system 1C according to the third embodiment, the configuration in which the transfer device controller 20 determines the shaping rate of the transfer devices 10 for each QoS class on the basis of the wireless quality information is also applicable to communication systems other than the mobile communication system. For example, if the one or more distributed stations 31 and the central station 32A in the third embodiment are replaced with wireless APs and a wireless LAN controller in a wireless LAN system, occurrence of packet loss due to congestion in the wireless LAN system can be suppressed by acquiring the wireless quality information regarding wireless communication between the wireless APs and the wireless terminals CL connected with the wireless APs.

Fourth Embodiment

Figure 7:
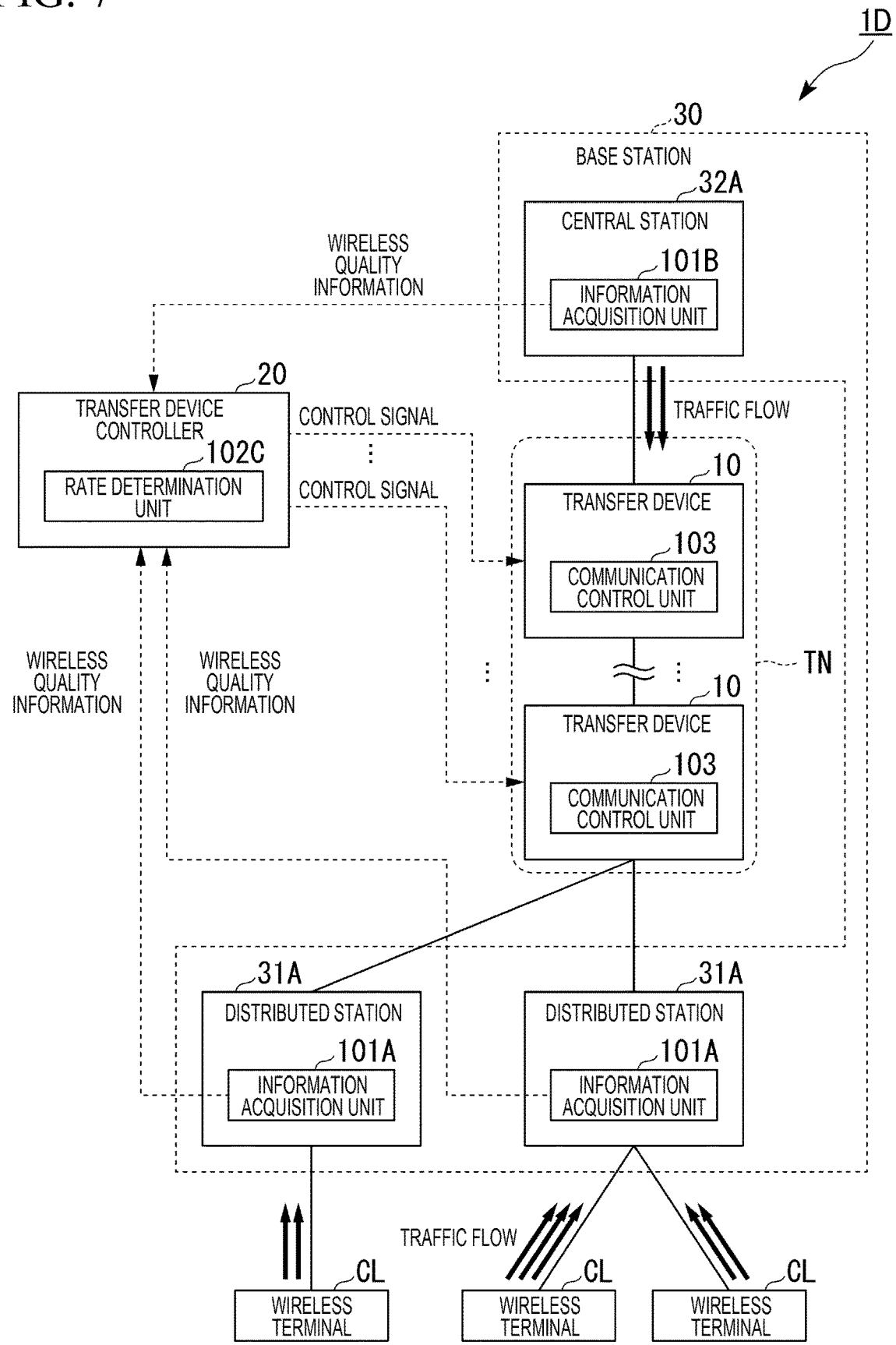
FIG. 7 is a diagram illustrating a system configuration example of a mobile communication system according to a fourth embodiment.
Figure 8:
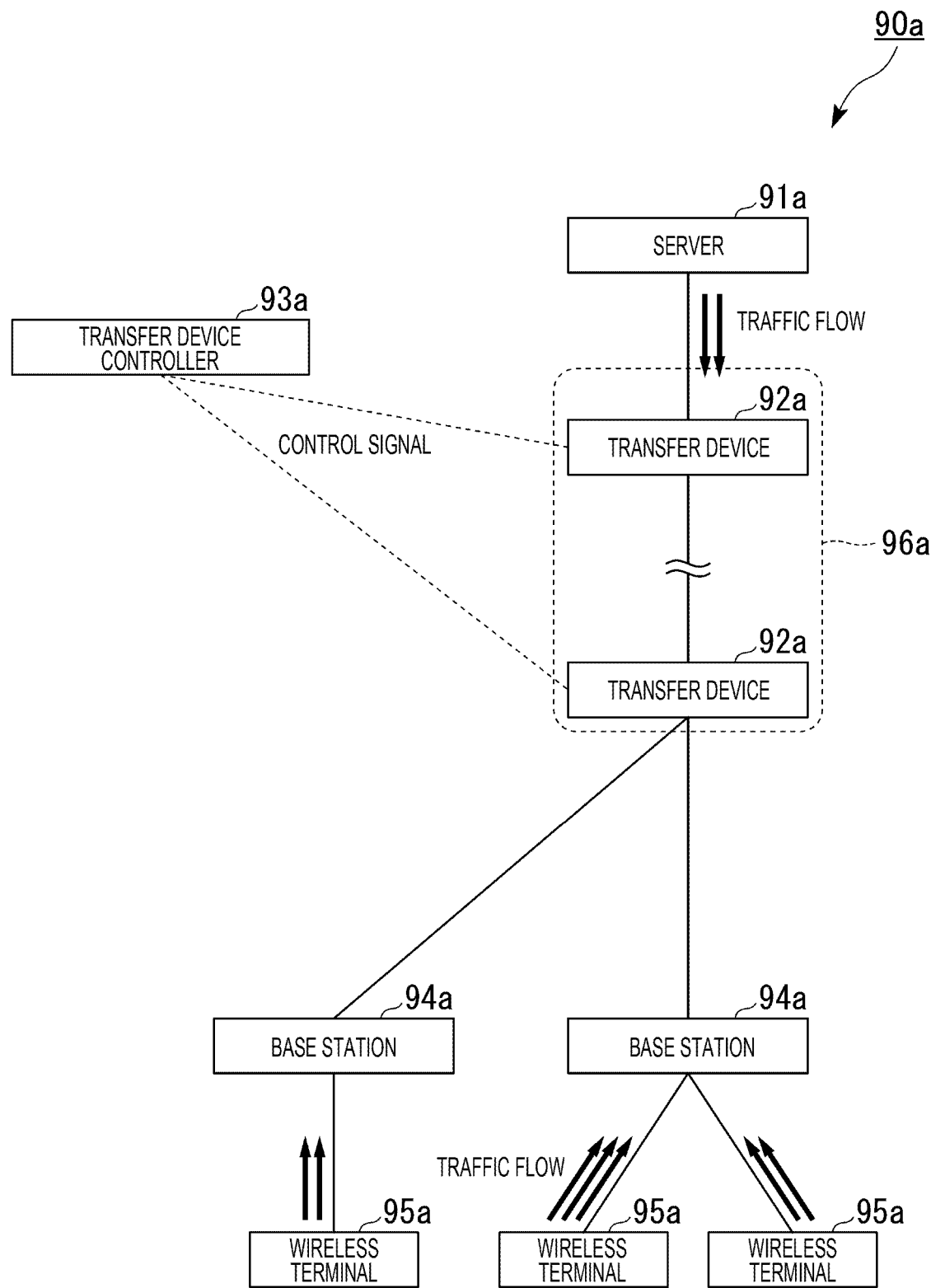
FIG. 8 is a diagram illustrating a configuration example of a mobile communication system according to a conventional technology.

FIG. 7 is a diagram illustrating a system configuration example of a mobile communication system 1D according to a fourth embodiment. The mobile communication system 1D is different from the mobile communication system 1A according to the first embodiment in that the base station 30 includes one or more distributed stations 31A and a central station 32A, and one or more transfer devices 10 transfer communication between the one or more distributed stations 31A and the central station 32A. Moreover, the mobile communication system 1D is different from the mobile communication system 1B according to the second embodiment in that not only each of the distributed stations 31A includes an information acquisition unit 101A, but also the central station 32A includes an information acquisition unit 101B. Other configurations of the mobile communication system 1D are similar to those of the mobile communication system 1A according to the first embodiment. Therefore, components similar to those of the mobile communication system 1A according to the first embodiment are denoted by the same reference signs as those in FIG. 2, and the description thereof will be omitted here.

As in the one or more transfer devices 10 and a transfer device controller 20 provided in the mobile communication system 1D, the one or more distributed stations 31A and the central station 32A are configured using, for example, a processor such as a CPU, a memory, and a communication interface. Each device of the one or more distributed stations 31A and the central station 32A functions as a communication device including a control unit when the processor executes a program.

The control unit provides each function for causing the communication device to function as a distributed station 31A or the central station 32A. Note that all or some of the functions of the control unit may be implemented by using hardware such as an ASIC, a PLD, or an FPGA. The above program may be recorded on a computer-readable recording medium. The computer-readable recording medium is, for example, a portable medium such as a flexible disk, a magneto-optical disk, a ROM, a CD-ROM, or a semiconductor storage device (e.g., SSD), or a storage device such as a hard disk or a semiconductor storage device built in a computer system. The above program may be transmitted via a telecommunication line.

For example, the one or more distributed stations 31A and the central station 32A in the fourth embodiment are one or more DUs and a CU in a mobile communication system. In this case, a section between the CU and the DUs where transfer devices 10 are installed is referred to as MMH. Moreover, for example, the one or more distributed stations 31A and the central station 32A in the fourth embodiment may be one or more RUs and a DU in a mobile communication system. In this case, a section between the DU and the RUs where transfer devices 10 are installed is referred to as a mobile front haul (MFH).

Specifically, in the mobile communication system 1D according to the fourth embodiment, each information acquisition unit 101A is provided in a control unit of a distributed station 31A, the information acquisition unit 101B is provided in a control unit of the central station 32A, the rate determination unit 102C is provided in a control unit of the transfer device controller 20, and each communication control unit 103 is provided in a control unit of a transfer device 10.

In this case, each of the information acquisition units 101A and the information acquisition unit 101B acquires wireless quality information regarding wireless communication between the one or more distributed stations 31 and one or more wireless terminals CL as wireless communication information, and transmit the acquired wireless quality information to the transfer device controller 20. The wireless quality information includes information indicating the number of traffic flows for each QoS class and the traffic volume for each QoS class in wireless communication between the base station 30 and the wireless terminals CL.

The rate determination unit 102C collects the wireless quality information acquired by the one or more information acquisition units 101A and the information acquisition unit 101B, and determines the shaping rate for each QoS class on the basis of the collected wireless quality information. Here, the rate determination unit 102C determines the shaping rate for each QoS class in consideration of the priority of the traffic flow and the traffic volume within a range satisfying a predetermined delay requirement so that packet loss due to congestion does not occur. The rate determination unit 102C notifies the communication control units 103 of the transfer devices 10 of the determined shaping rate.

Then, the communication control units 103 in the one or more transfer devices 10 each execute traffic shaping of the own device on the basis of the shaping rate, a notice of which is given from the rate determination unit 102C of the transfer device controller 20.

According to the mobile communication system 1D of the fourth embodiment configured as described above, the transfer devices 10 perform shaping for each QoS class according to the shaping rate determined for each QoS class on the basis of the wireless quality information regarding wireless communication between the one or more wireless terminals CL and the one or more distributed stations 31A. The mobile communication system 1D according to the fourth embodiment can increase the shaping rate in advance before getting into a state in which packet loss due to congestion in the transfer device network TN may occur in a specific traffic flow. As a result, the mobile communication system 1D according to the fourth embodiment can suppress occurrence of packet loss due to congestion that may occur in the transfer device network TN.

Note that, although a case where the base station 30 directly supplies the wireless quality information to the transfer device controller 20 has been described in the above embodiment, the wireless quality information may be supplied to the transfer device controller 20 via a device other than the base station 30. For example, in a case where there are a plurality of base stations 30 and there is further a wireless controller that controls the plurality of base stations 30 in the mobile communication system 1D, the wireless controller may be configured to collect wireless quality information from the plurality of base stations 30 and supply the collected wireless quality information of the plurality of base stations 30 to the transfer device controller 20.

Note that, in the mobile communication system 1D according to the fourth embodiment, the configuration in which the transfer device controller 20 determines the shaping rate of the transfer devices 10 for each QoS class on the basis of the wireless quality information is also applicable to communication systems other than the mobile communication system. For example, if the one or more distributed stations 31A and the central station 32A in the fourth embodiment are replaced with wireless APs and a wireless LAN controller in a wireless LAN system, occurrence of packet loss due to congestion in the wireless LAN system can be suppressed by acquiring the wireless quality information regarding wireless communication between the wireless APs and the wireless terminals CL connected with the wireless APs.

According to the embodiments described above, the communication system includes one or more base stations that each accommodate a wireless terminal, one or more transfer devices that transfer upstream communication of the wireless terminals received via the base stations to the host side, and a transfer device controller that controls the one or more transfer devices. For example, the communication system is the mobile communication system 1A, 1A', 1B, 1C, or 1D in the embodiments, the wireless terminal is the wireless terminal CL in the embodiments, the base station is the base station 30, 30-1, or 30-2 in the embodiments, and the transfer device controller is the transfer device controller 20 in the embodiments.

The above communication system includes an information acquisition unit, a rate determination unit, and a communication control unit. For example, the information acquisition unit is the information acquisition unit 101A or 101B in the embodiments, the rate determination unit is the rate determination unit 102A or 102B in the embodiments, and the communication control unit is the communication control unit 103 in the embodiments.

The information acquisition unit acquires information regarding wireless communication for each service quality class. The rate determination unit determines the shaping rate of traffic shaping for each service quality class on the basis of the information regarding wireless communication for each service quality class so that packet loss due to congestion does not occur. The communication control unit executes traffic shaping for each service quality class on the host side of the base station on the basis of the shaping rate determined by the rate determination unit. For example, the service quality class is a QoS class in the embodiments, and the information regarding wireless communication is the wireless quality information and the wireless communication information in the embodiments.

Note that the information acquisition unit may acquire wireless quality information regarding wireless communication between the base stations and the wireless terminals for each service quality class, the rate determination unit may determine a shaping rate to be applied to one or more transfer devices for each service quality class on the basis of correspondence information indicating a correspondence between the wireless quality information and the shaping rate and the wireless quality information acquired from the base station, and the communication control unit may execute traffic shaping at the shaping rate determined for each service quality class by the rate determination unit in the one or more transfer devices.

Note that the base station may include distributed stations and a central station, the information acquisition unit may acquire wireless quality information regarding wireless communication between the distributed stations and the wireless terminals for each service quality class, the rate determination unit may determine a shaping rate to be applied to one or more transfer devices for each service quality class on the basis of correspondence information indicating a correspondence between the wireless quality information and the shaping rate and the wireless quality information acquired from the distributed stations, and the communication control unit may execute traffic shaping at the shaping rate determined for each service quality class by the rate determination unit in the one or more transfer devices. For example, the distributed station is the distributed station 31 or 31A in the embodiments, the central station is the central station 32 or 32A in the embodiments, and the correspondence information is a correspondence table in the embodiments in which a candidate of an appropriate shaping rate set in advance according to a value of 5QI is associated with the value of 5QI.

Note that the base station may include distributed stations and a central station, the information acquisition unit may acquire wireless quality information regarding wireless communication between the distributed stations and the wireless terminals for each service quality class, the rate determination unit may determine a shaping rate to be applied to one or more transfer devices for each service quality class on the basis of correspondence information indicating a correspondence between the wireless quality information and the shaping rate and the wireless quality information acquired from the central station, and the communication control unit may execute traffic shaping at the shaping rate determined for each service quality class by the rate determination unit in the one or more transfer devices.

Note that the base station may include distributed stations and a central station, the information acquisition unit may acquire wireless quality information regarding wireless communication between the distributed stations and the wireless terminals for each service quality class, the rate determination unit may determine a shaping rate to be applied to one or more transfer devices for each service quality class on the basis of correspondence information indicating a correspondence between the wireless quality information and the shaping rate and the wireless quality information acquired from the distributed stations and the central station, and the communication control unit may execute traffic shaping at the shaping rate determined for each service quality class by the rate determination unit in the one or more transfer devices.

Note that the wireless quality information may include at least one of the number of traffic flows for each service quality class or information indicating the traffic volume for each service quality class, and the rate determination unit may determine the shaping rate for each service quality class on the basis of the number of traffic flows and the traffic volume.

Although embodiments of the present invention have been described in detail with reference to the drawings, the specific configuration is not limited to the embodiments, and includes a design and the like within a range not departing from the scope of the present invention.

INDUSTRIAL APPLICABILITY

The present invention is applicable to a communication system that accommodates a wireless terminal, and a communication control apparatus.

REFERENCE SIGNS LIST 1A, 1A', 1B, 1C, 1D Mobile communication system
10, 10-1, 10-2, 10-3 Transfer device
20 Transfer device controller
30, 30-1, 30-2 Base station
31, 31A Distributed station
32, 32A Central station
40 Wireless controller
90, 90a Mobile communication system
91, 91a Server
92, 92a Transfer device
93, 93a Transfer device controller
94, 94a Base station
95, 95a Wireless terminal
96, 96a Transfer device network
101A, 101B Information acquisition unit (Information acquirer)
102A, 102B Rate determination unit (Rate determiner)
103 Communication control unit (Communication controller)

The invention claimed is:

1. A communication system comprising:
at least one base station that accommodates a wireless terminal;
at least one transfer device that transfers upstream communication of the wireless terminal received via the base station to a host side; and
a transfer device controller that controls the at least one transfer device,
wherein the communication system further comprises:
an information acquirer configured to acquire information regarding wireless communication between the base station and the wireless terminal for each service quality class;
a rate determiner configured to determine a shaping rate of traffic shaping for each service quality class on a basis of the information regarding wireless communication for each service quality class so that packet loss due to congestion does not occur; and
a communication controller configured to execute traffic shaping for each service quality class on a host side of the base station on a basis of the shaping rate determined by the rate determiner.

2. The communication system according to claim 1, wherein the information acquirer configured to acquire wireless quality information regarding wireless communication between the base station and the wireless terminal for each service quality class,
the rate determiner configured to determine a shaping rate to be applied to the at least one transfer device for each service quality class on a basis of correspondence information indicating a correspondence between wireless quality information and a shaping rate and wireless quality information acquired from the base station, and
the communication controller configured to execute traffic shaping at a shaping rate determined for each service quality class by the rate determiner in the at least one transfer device.

3. The communication system according to claim 2, wherein the wireless quality information includes at least one of a number of traffic flows for each service quality class or information indicating a traffic volume for each service quality class, and
the rate determiner configured to determine the shaping rate for each service quality class on a basis of the number of traffic flows and the traffic volume.

4. The communication system according to claim 1, wherein the base station includes a distributed station and a central station,
the information acquirer configured to acquire wireless quality information regarding wireless communication between the distributed station and the wireless terminal for each service quality class,
the rate determiner configured to determine a shaping rate to be applied to the at least one transfer device for each service quality class on a basis of correspondence information indicating a correspondence between wireless quality information and a shaping rate and wireless quality information acquired from the distributed station, and
the communication controller configured to execute traffic shaping at a shaping rate determined for each service quality class by the rate determiner in the at least one transfer device.

5. The communication system according to claim 1, wherein the base station includes a distributed station and a central station,
the information acquirer configured to acquire wireless quality information regarding wireless communication between the distributed station and the wireless terminal for each service quality class,
the rate determiner configured to determine a shaping rate to be applied to the at least one transfer device for each service quality class on a basis of correspondence information indicating a correspondence between wireless quality information and a shaping rate and wireless quality information acquired from the central station, and
the communication controller configured to execute traffic shaping at a shaping rate determined for each service quality class by the rate determiner determination unit in the at least one transfer device.

6. The communication system according to claim 1, wherein the base station includes a distributed station and a central station, the information acquirer configured to acquire wireless quality information regarding wireless communication between the distributed station and the wireless terminal for each service quality class, the rate determiner configured to determine a shaping rate to be applied to the at least one transfer device for each service quality class on a basis of correspondence information indicating a correspondence between wireless quality information and a shaping rate and wireless quality information acquired from the distributed station and the central station, and the communication controller configured to execute traffic shaping at a shaping rate determined for each service quality class by the rate determiner in the at least one transfer device.

7. A communication control method performed in a communication system including:

at least one base station that accommodates a wireless terminal;

at least one transfer device that transfers upstream communication of the wireless terminal received via the base station to a host side; and a transfer device controller that controls the at least one transfer device, wherein the communication control method comprising:

acquiring information regarding wireless communication between the base station and the wireless terminal for each service quality class;

determining a shaping rate of traffic shaping for each service quality class on a basis of the information regarding wireless communication for each service quality class so that packet loss due to congestion does not occur; and executing traffic shaping for each service quality class on a host side of the base station on a basis of the shaping rate determined.

8. A transfer device controller for controlling at least one transfer device that transfers upstream communication of a wireless terminal received via at least one base station that accommodates the wireless terminal to a host side, the transfer device controller comprising:

a rate determiner configured to determine a shaping rate of traffic shaping for each service quality class on a basis of information regarding wireless communication between the base station and the wireless terminal for each service quality class so that packet loss due to congestion does not occur; and a transmitter configured to transmit the shaping rate determined by the rate determiner to the transfer device that executes traffic shaping for each service quality class on a host side of the base station.

* * * * *